United States Patent [19]

Nishizawa et al.

[11] Patent Number: 4,715,800
[45] Date of Patent: Dec. 29, 1987

[54] ROTARY COMPRESSOR WITH CLUTCH ACTUATED BY HYDRAULIC FLUID AND COMPRESSED FLUID

[75] Inventors: Kazutoshi Nishizawa, Toyoake; Masashi Takagi, Kariya; Akio Matsuoka, Obu; Fuzio Nomura, Chiryu, all of Japan

[73] Assignee: Nippondenso Co., Ltd., Kariya, Japan

[21] Appl. No.: 31,179

[22] Filed: Mar. 26, 1987

Related U.S. Application Data

[63] Continuation of Ser. No. 788,218, Oct. 16, 1985, abandoned.

[30] Foreign Application Priority Data

Oct. 17, 1984 [JP] Japan ............................. 59-219236
Jul. 2, 1985 [JP] Japan ............................. 60-145496

[51] Int. Cl.$^4$ .................. F04C 29/00; F04B 35/00; F04B 49/02; F16D 25/063
[52] U.S. Cl. ......................... 418/69; 417/310; 417/319; 192/83; 192/85 AA
[58] Field of Search ............. 418/69; 417/223, 310, 417/319; 192/83, 85 AA, 85 AB, 85 R

[56] References Cited

U.S. PATENT DOCUMENTS

| | | | |
|---|---|---|---|
| 2,876,881 | 3/1959 | Parrett | 192/85 AA |
| 2,992,769 | 7/1961 | Manzanera | 418/69 |
| 3,626,968 | 12/1971 | Hancock | 192/85 R |
| 4,449,622 | 5/1984 | Okano et al. | 192/84 C |
| 4,557,670 | 12/1985 | Inagaki et al. | 417/310 |
| 4,560,047 | 12/1985 | McCarthy et al. | 192/85 AA |
| 4,561,827 | 12/1985 | Beaumont | 417/319 |

FOREIGN PATENT DOCUMENTS 59-6427 1/1984 Japan.
294567 4/1965 Netherlands ............. 192/85 AA Primary Examiner—John J. Vrablik
Attorney, Agent, or Firm—Cushman, Darby & Cushman

[57] ABSTRACT

A rotary compressor comprises an input shaft, a compressor component and a clutch component movable between an engaged position where the compressor component is connected to the input shaft to allow a torque to be transmitted from the input shaft to the compressor component and a disengaged position where the compressor component is disconnected from the input shaft to prevent the torque from being transmitted from the input shaft to the compressor component. A hydraulic pump is drivingly connected to the input shaft to discharge a pressurized working fluid upon the rotation of the input shaft. The clutch component includes a clutch member disposed within a clutch cylinder and cooperating therewith to define a pressure chamber. A valve unit is movable between a position where the pressurized working fluid from the pump is allowed to be applied to the pressure chamber to cause the clutch member to be engaged with a rotor member of the compressor component thereby moving the clutch component to the engaged position and a position where the pressurized working fluid from the pump is prevented from being applied to the pressure chamber to prevent the clutch member from engaging with the rotor member to move the clutch component to the disengaged position.

10 Claims, 16 Drawing Figures

ROTARY COMPRESSOR WITH CLUTCH ACTUATED BY HYDRAULIC FLUID AND COMPRESSED FLUID

This is a continuation of application Ser. No. 788,218, filed Oct. 16, 1985, which was abandoned upon the filing hereof.

BACKGROUND OF THE INVENTION

1. Field of the Invention

The present invention relates to a rotary compressor which is particularly effective as a compressor for a refrigerant in an air-conditioning system of an automotive vehicle, for example.

2. Related Art Statement

In general, a clutch has been utilized which is disposed between a shaft of a rotary compressor and a driving source and is movable between an engaged position where a power is allowed to be transmitted from the driving source to the shaft and a disengaged position where the power is prevented from being transmitted from the driving source to the shaft. As such a clutch, an electromagnetic clutch has frequently been utilized.

However, the clutch as described above cannot be smoothly moved into the engaged position, and there may occur such a problem that it is impossible to sufficiently prevent a shock due to the vibration upon the engagement of the clutch from being imparted to passengers of the vehicle. In addition, another problem may also be raised that abrupt variation in load to an engine occurs, to thereby deteriorate the drivability of the vehicle.

OBJECT AND SUMMARY OF THE INVENTION

An object of the present invention is to provide a rotary compressor which can substantially overcome the disadvantages described above.

According to the present invention, there is provided a rotary compressor comprising: an input shaft; a compressor component including a housing and a rotor member disposed in the housing and connectable to the input shaft, the rotor member cooperating with the housing to define at least one compression chamber having a volume varying with the rotation of the rotor member; a clutch component including a clutch cylinder disposed around the input shaft, a clutch member disposed in the clutch cylinder and mounted on the input shaft for rotation therewith, the clutch member cooperating with the clutch cylinder to define therein a pressure chamber, the clutch member being movable axially of the input shaft between an engaged position where the clutch member engages with the rotor member to allow a torque to be transmitted from the input shaft to the rotor member and a disengaged position where the clutch member is disengaged from the rotor member to prevent the torque form being transmitted from the input shaft to the rotor member, and biasing means for biasing the clutch member toward the disengaged position; a hydraulic pump drivingly connected to the input shaft to discharge a pressurized working fluid upon the rotation of the input shaft; and valve means movable between a first position where the pressurized working fluid from the hydraulic pump is allowed to be applied to the pressure chamber to move the clutch member to the engaged position against the action of the biasing means and a second position where the pressurized working fluid from the hydraulic pump is prevented from being applied to the pressure chamber to cause the biasing means to move the clutch member to the disengaged position.

According to the present invention, there is further provided a rotary compressor comprising an input shaft; a compressor component including a housing and a rotor member disposed in the housing and connectable to the input shaft, the rotor member cooperating with the housing to define at least one compression chamber having a volume varying with the rotation of the rotor member, a first pressurized working fluid being discharged from the compression chamber when the rotor member is connected to the input shaft and rotated thereby; a clutch component including a first piston member disposed in the first clutch cylinder so as to be movable axially of the input shaft and cooperating with the first clutch cylinder to define therein a first pressure chamber, a second clutch cylinder connected to the input shaft for rotation therewith, a second piston member disposed in the second clutch cylinder so as to face to the first piston member but spaced therefrom axially of the input shaft and cooperating with the second clutch cylinder to define therein a second pressure chamber, a plurality of first clutch members disposed between the first and second piston members and mounted on the input shaft for rotation therewith, a plurality of second clutch members with one disposed between each pair of adjacent first clutch members and mounted on the second clutch cylinder for rotation therewith, the first and second clutch members being movable axially of the input shaft between an engaged position where the first and second clutch members engage with each other to allow a torque to be transmitted from the input shaft to the rotor member and a disengaged position where the first and second clutch members are disengaged from each other to prevent the torque from being transmitted from the input shaft to the rotor member, and biasing means for biasing the first and second clutch members toward the disengaged position; a hydraulic pump drivingly connected to the input shaft for discharging a second pressurized working fluid upon the rotation of the input shaft; and first valve means movable between a first position where the second pressurized working fluid from the hydraulic pump is allowed to be applied to the first pressure chamber to cause the first piston member to move the first and second clutch members to the engaged position against the action of the biasing means and a second position where the second pressurized working fluid from the hydraulic pump is prevented from being applied to the first pressure chamber to cause the biasing means to move the first and second clutch members to the disengaged position; and second valve means movable between a first position where the first pressurized working fluid from the compressor component is allowed to be applied to the second pressure chamber to cause the second piston member to move the first and second clutch members to the engaged position against the action of the biasing means and a second position where the first pressurized working fluid from the compressor component is prevented from being applied to the second pressure chamber to cause the biasing means to move the first and second clutch members to the disengaged position.

DETAILED DESCRIPTION OF THE PREFERRED EMBODIMENTS

Figure 1:
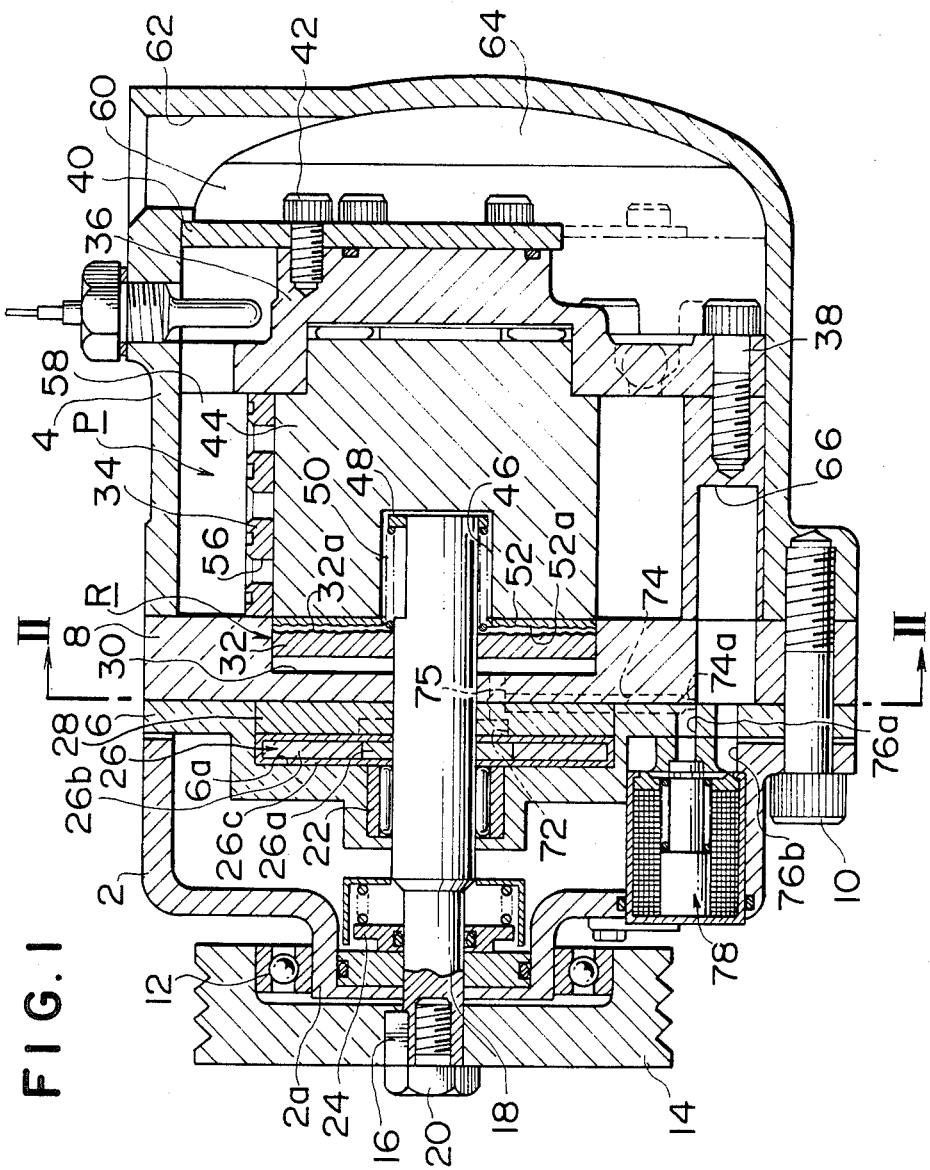
FIG. 1 is a longitudinal cross-sectional view showing a rotary compressor in accordance with a first embodiment of the present invention with a clutch component being in a disengaged position.

FIG. 1 is a longitudinal cross-sectional view showing a refrigerant compressor in accordance with an embodiment of the present invention, which is particularly suitable for use in an air-conditioning system for an automotive vehicle. The compressor comprises a front housing 2 and a rear housing 4, which cooperate with each other to form an outer configuration of the compressor. The housings 2 and 4 are secured together by bolts 10 with a first plate 6 and a second plate 8 being located therebetween. A pulley 14 is arranged around a hub 2a of the front housing 2 through a bearing 12. The pulley 14 is mounted on one end of an input shaft 18 through a key 16 for rotation with the shaft 18 with the key 16 being retained in position by a bolt 20. The shaft 18 is rotatably supported by the first plate 6 through a bearing 22, and the other end of the shaft 18 extends through the second plate 8 and terminates in the rear housing 4. A seal unit 24 is disposed between the hub 2a of the front housing 2 and the shaft 18 in order to prevent fluid from leaking out along the surface of the shaft 18. A recess 6a is formed in the first plate 6, and a well-known trochoid pump, generally designated by the reference numeral 26, is housed in the recess 6a and is driven by the rotation of the shaft 18. The trochoid pump 26 is similar in construction to a trochoid pump shown in FIG. 11 and to be described later, and comprises an inner rotor 26a, an outer rotor 26b and a casing 26c encasing the rotors 26a and 26b. The inner rotor 26a is mounted on the shaft 18 for rotation therewith. An auxiliary plate 28 is disposed to cover the recess 6a after the trochoid pump 26 is housed in the recess 6a.

A clutch component, generally designated by the reference character R, comprises an oil pressure chamber 30 constructed by a recess formed in the second plate 8 so as to open toward the rear housing 4. A clutch member 32 in the form of a disc having a friction surface 32a of a coarse roughness is disposed in the oil pressure chamber 30. The clutch member 32 is slidable axially of the shaft 18, but is fixedly mounted on the shaft 18 for rotation therewith.

Figure 2:
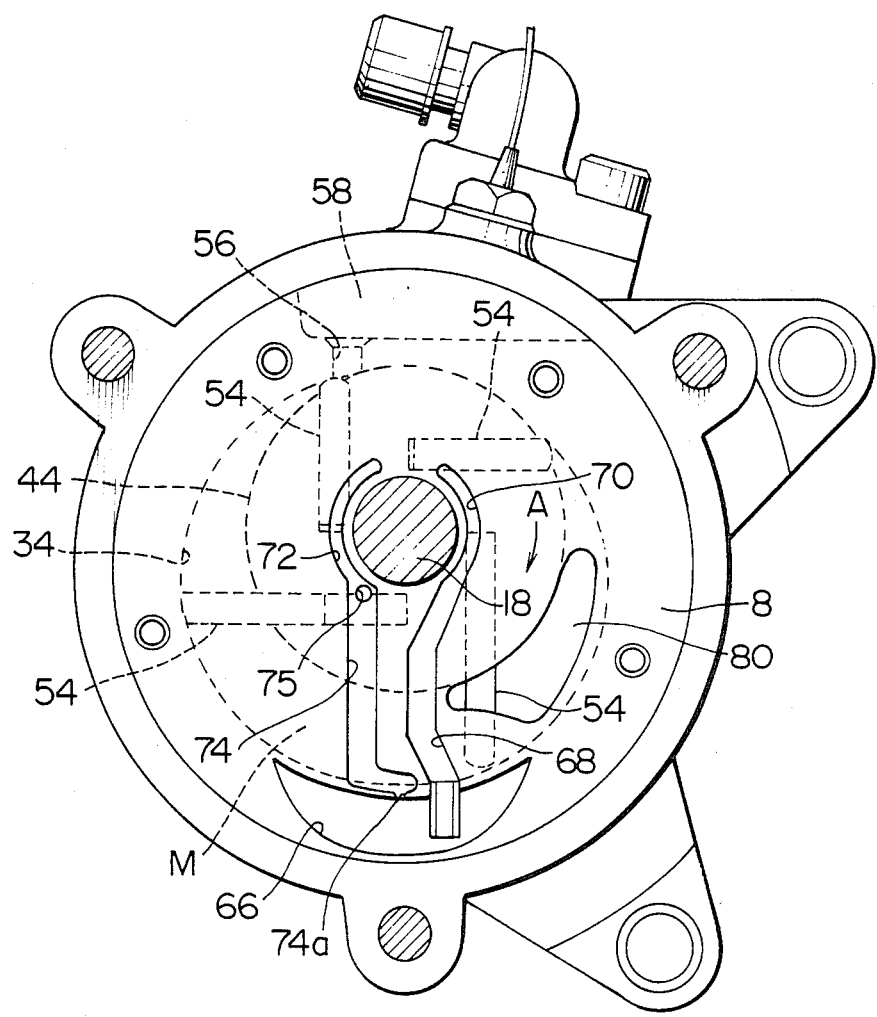
FIG. 2 is a cross-sectional view taken along the line II—II in FIG. 1.

A compressor component, generally designated by the reference character P, comprises a cylinder member 34 disposed in the rear housing 4 and having an inner cylindrical surface. The cylinder member 34 is fixedly secured to a bearing member 36 disposed in the rear housing 4, by bolts 38. A central axis of the inner cylindrical surface of the cylinder member 34 extends in eccentric relation to a central axis of the shaft 18, and a cylindrical rotor 44 serving as a rotary member is disposed in the cylinder member 34. A blind bore 46 is formed at the center of the rotor 44, and the other end of the shaft 18 described previously is inserted in the bore 46. A spring retainer 48 is provided on the other end of the shaft 18, and a spring 50 is disposed between the clutch member 32 and the spring retainer 48 to bias the clutch member 32 away from the rotor 4. Further, a friction plate 52 having a friction surface 52a is bonded to the surface of the rotor 44 facing to the clutch member 32. As shown in FIG. 2, four grooves are formed in the circumferential surface of the rotor 44 and four vanes 54 in the form of a plate are located in these grooves, respectively. Thus, compression chambers M are defined by these vanes 54, the outer peripheral wall of the rotor 44 and the inner cylindrical surface of the cylinder member 34, respectively.

As shown in FIGS. 1 and 2, discharge openings 56 for discharging compressed fluid in the compression chamber M are formed in the cylinder member 34. The discharge openings 56 communicate with a discharge chamber 58 formed between the rear housing 4 and the cylinder member 34, and with a discharge port 62 through a discharge passage 60. An oil separator is arranged in the discharge passage 60 for separating lubricant contained in the refrigerant acting as a compression fluid.

An oil sump 66 for storing oil therein is formed in the cylinder member 34 and the second plate 8. As shown in FIG. 2, the oil sump 66 communicates with a suction opening 70 of the trochoid pump 26 through a suction passage 68, and a discharge opening 72 of the trochoid pump 26 communicates with the oil sump 66 through a discharge passage 74. Both the suction passage 68 and the discharge passage 74 are formed in the joined surfaces of the auxiliary plate 28 and the second plate 8 and the joint surfaces of the first plate 6 and the second plate 8. The discharge opening 72 communicates with the oil pressure chamber 30 through a passage 75. The passage 75 extends through the auxiliary plate 28 and the second plate 8. The opening 74a of the discharge passage 74 which opens in the oil sump 66 is extremely restricted and has a high flow resistance. First and second bypass passages 76a and 76b are formed in communication with the discharge passage 74 so as to bypass the opening 74a. An electromagnetic valve, generally designated by the reference numeral 78, is provided in the bypass passages 76a and 76b for permitting and interrupting the communication therebetween.

As seen from FIG. 2, the cross-sectional configuration of the oil sump 66 is in the form of crescent and a suction opening 80 is formed in the second plate 8 for introducing the refrigerant into the compression chambers M. The suction opening 70 and the discharge opening 72 are so shaped as to enclose the shaft 18 from the opposite sides thereof.

Figure 3:
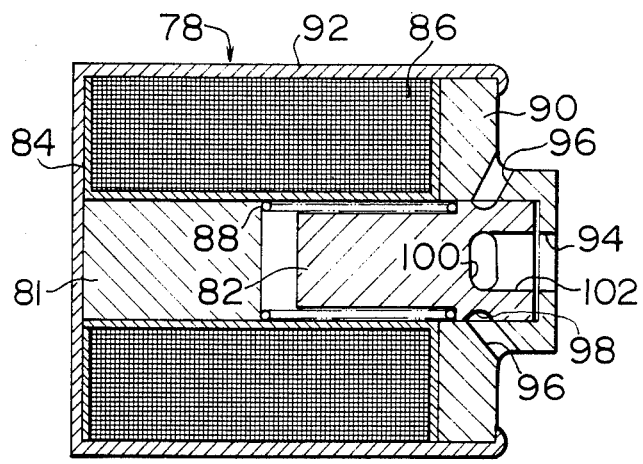
FIG. 3 is an enlarged cross-sectional view showing an electromagnetic valve shown in FIG. 1 with the electromagnetic valve being in a deenergized position.
Figure 4:
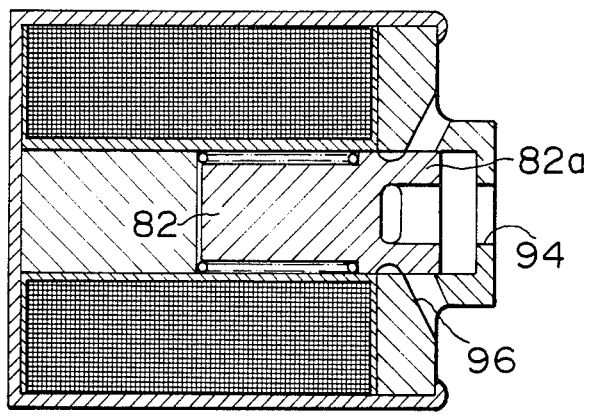
FIG. 4 is a view similar to FIG. 3, but showing the electromagnetic valve in an energized position.

The construction of the electromagnetic valve 78 will be described with reference to FIGS. 3 and 4. FIG. 3 shows the electromagnetic valve 78 in its open position, and FIG. 4 shows the electromagnetiic valve 78 in its closed position. A stationary core 81 and a plunger 82 each made of a magnetic material are arranged in opposing relationship to each other with a spring 88 interposed therebetween for biasing the plunger 82 away from the stationary core 81. A bobbin 84 made of a non-magnetic material is disposed around the stationary core 81 and the plunger 82, and a solenoid coil 86 is wound around the periphery of the bobbin 84. A cover 90 made of a magnetic material is disposed at the side of the plunger 82, and a yoke 92 arranged to enclose the outer periphery of the solenoid coil 86 is secured to the cover 90. The cover 90 has formed therein a first through-bore 94 communicating with the first bypass passage 76a shown in FIG. 1 and second through-bores 96 communicating with the second bypass passage 76b shown in FIG. 1.

Figure 5:
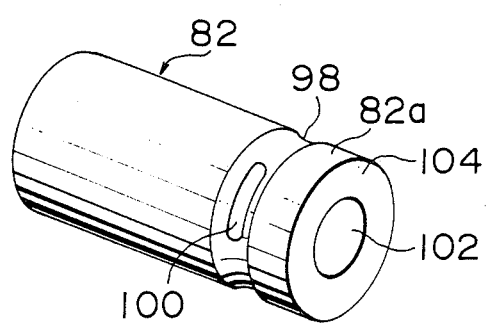
FIG. 5 is a perspective view showing a plunger shown in FIGS. 3 and 4.

FIG. 5 is a perspective view of the above-described plunger 82. The plunger 82 is in the form of a column, and an circumferential groove 98 in the form of arc in cross-section is formed in the outer periphery of the plunger 82. A first radial connecting passage 100 diametrically extending through the plunger 82 is formed in the bottom of the groove 98. A second axial connecting passage 102 is formed in the end surface 104 of the plunger 82, and the second connecting passage 102 and the first connecting passage 100 communicate with each other in the interior of the plunger 82. During the deenergization of the solenoid coil 86, the plunger 82 is moved by the biasing force of the spring 88 to a position where the plunger 82 abuts against the cover 90 and the groove 98 is in alignment with the second through-bores 96, as shown in FIG. 3. At the same time, the second connecting passage 102 and the first through-bore 94 are located adjacent to each other in alignment with each other. When the solenoid coil 86 is energized, the plunger 82 is attracted by the stationary core 81, and the second through-bores 96 are closed by a head 82a of the plunger 82, as shown in FIG. 4, so that the communication between the first through-bore 94 and the second through-bores 96 is intercepted.

The operation of the rotary compressor in accordance with the embodiment of the present invention will be described hereinafter. When the pulley 14 receives a driving force from a driving source (not shown) such as an engine of a vehicle, for example, to cause the shaft 18 to be rotated, the inner rotor 26a of the trochoid pump 26 is rotated to draw the oil from the oil sump 66 into the trochoid pump 26 through the suction passage 68 and to discharge the oil from the discharge opening 72. At this time, if the electromagnetic valve 78 is deenergized, the substantial part of the oil discharged from the discharge opening 72 is returned to the oil sump 66 through the discharge passage 74 and the first and second bypass passages 76a and 76b, because the first bypass passage 76a communicates with the second bypass passage 76b. Accordingly, the amount of the oil introduced into the oil pressure chamber 30 through the passage 75 is a little, if any, and the oil pressure in the pressure chamber 30 is not so raised. Thus, the clutch member 32 is maintained spaced from the friction plate 52 by the biasing force of the spring 50 so that the rotating force of the shaft 18 is not transmitted to the rotor 44.

When a switch (not shown) of an air-conditioning system for a vehicle is turned on, the electromagnetic valve 78 is energized to intercept the communication between the first and second bypass passages 76a and 76b. Then, the oil discharged from the discharge opening 72 tends to flow into the oil sump 66 through the discharge passage 74 and the opening 74a thereof. However, since the opening 74a is restricted, the oil can hardly flow through the opening 74a. Thus, the substantial part of the oil flows into the oil pressure chamber 30 through the passage 75 so that the oil pressure therein is raised. As a result, the clutch member 32 receives the force of the oil pressure and gradually approaches the friction plate 52 by overcoming the biasing force of the spring 50. Finally, the clutch member 32 abuts against the friction plate 52. Thus, the rotating force of the shaft 18 is transmitted to the rotor 44 through the clutch member 32 and the friction plate 52 thereby rotating the rotor 44. As the rotor 44 is rotated, variation in the volume of the compression chamber M is caused so that the refrigerant is drawn from the suction opening 80 into the compression chamber M. Subsequently, the drawn refrigerant is gradually compressed with the rotation of the rotor 44 and is discharged from the discharge port 62 through the discharge opening 56, the discharge chamber 58 and the discharge passage 60.

Figure 6:
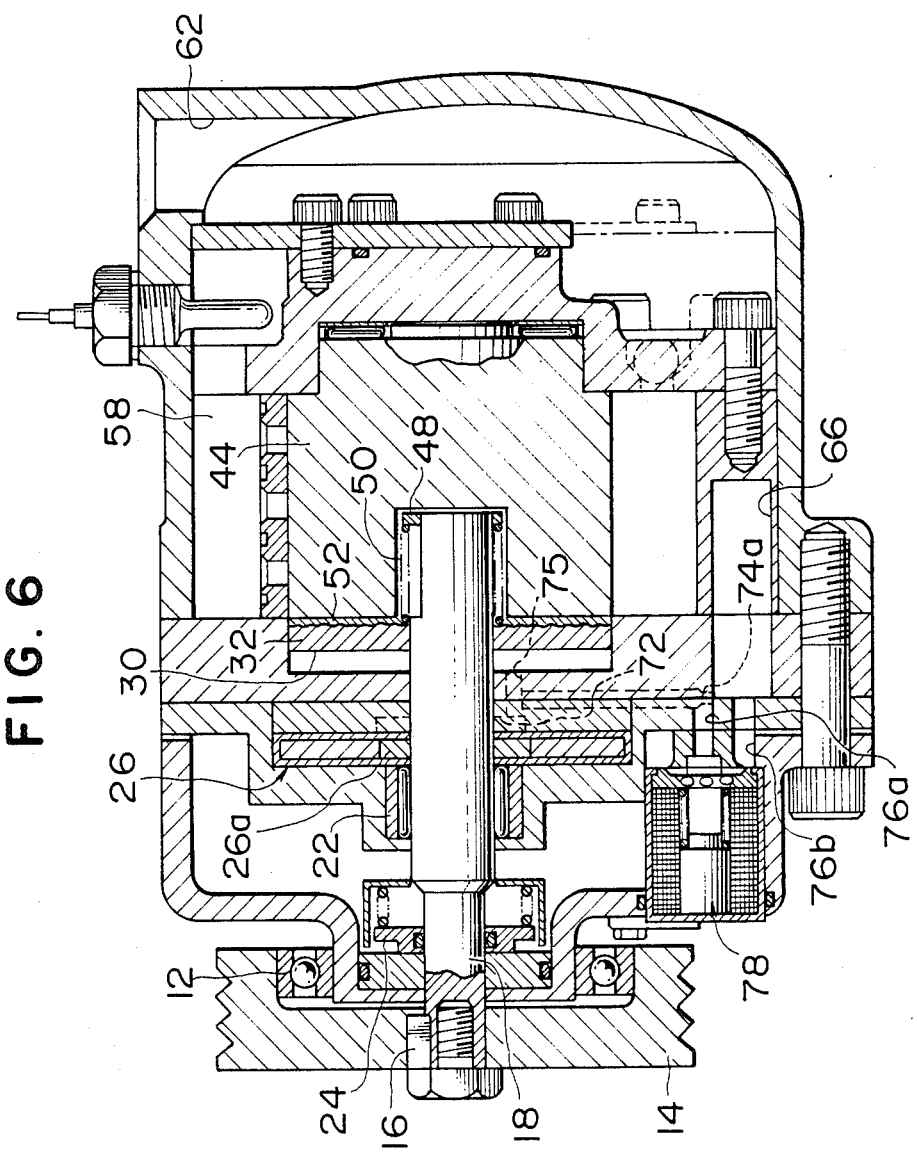
FIG. 6 is a view similar to FIG. 1, but showing the clutch component in an engaged position.

The above-described operation is repeated. It is important here that the clutch member 32 is gradually moved by the oil pressure within the oil pressure chamber 30 and is engaged with the friction plate 52, as shown in FIG. 6. Therefore, the engagement between the clutch member 32 and the friction plate 52 is effected very smoothly, and no substantial shock occurs at the time of engagement.

Figure 7:
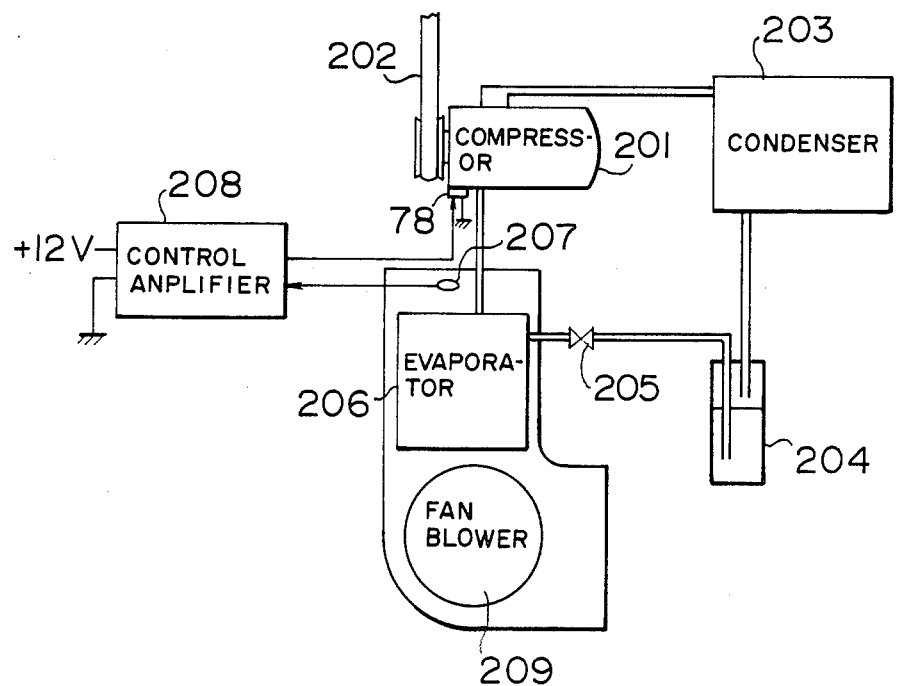
FIG. 7 is a block diagram showing a system wherein the rotary compressor is incorporated in an air-conditioning system for an automotive vehicle.

A system shown in FIG. 7 comprises a compressor 201 in accordance with the first embodiment of the present invention shown in FIGS. 1-6, a belt 202 for transmitting a driving force of a vehicle engine, a condenser 203, a refrigerant reservoir 204, an expansion valve 205, an evaporator 206, a thermister 207, a control amplifier 208 and a fan blower 209. The temperature of air blown out of the evaporator 206 is detected by the thermister 207 so that the electromagnetic valve 78 is energized or deenergized to control the compressor 201. When the electromagnetic valve 78 is energized, the clutch member 32 is engaged with the friction plate 52 by the oil pressure, and the suction and discharge of the refrigerant by the compressor 201 commences. At this time, the engagement of the clutch member 32 with the friction plate 52 is not rapid and it is possible to reduce or relieve the starting shock, because the engagement is effected by the action of the oil.

Figure 8:
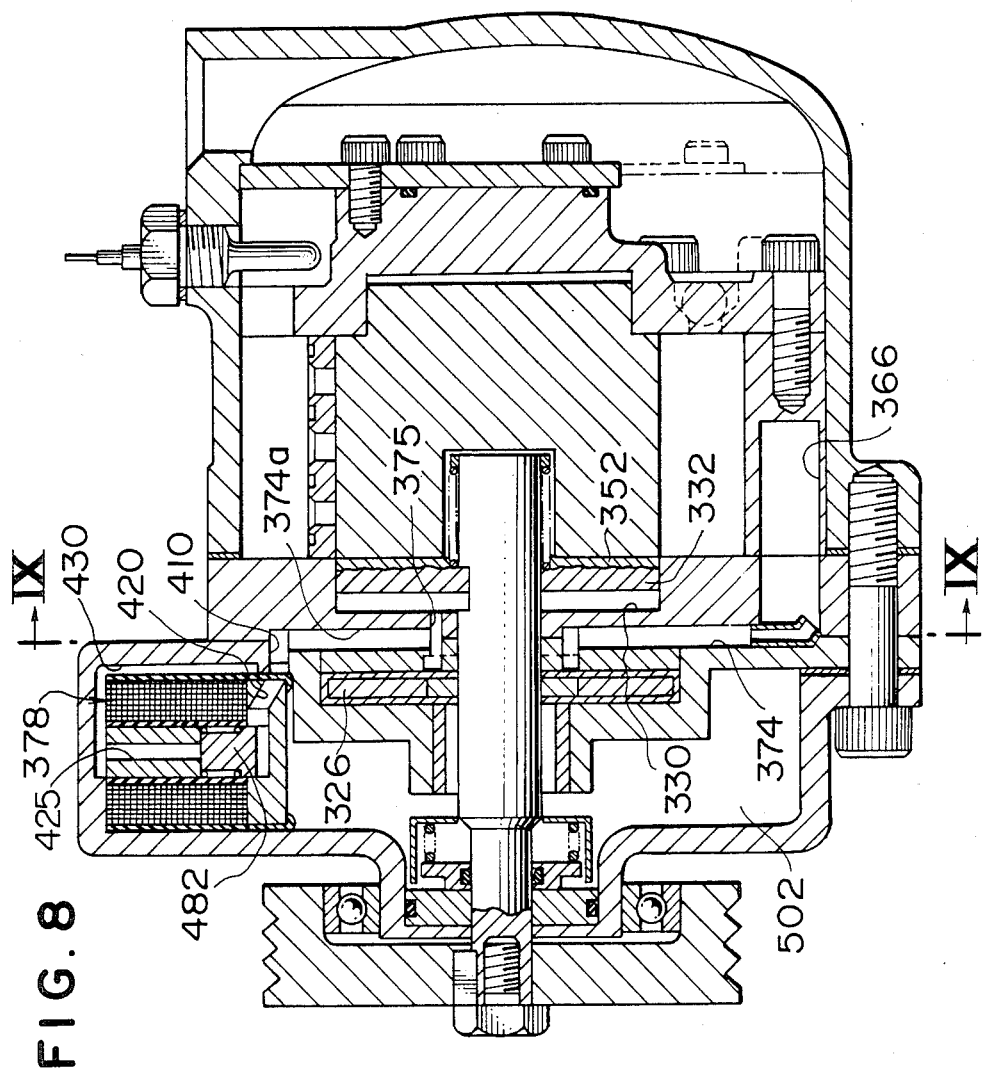
FIG. 8 is a view similar to FIG. 6, but showing a second embodiment of the present invention.
Figure 9:
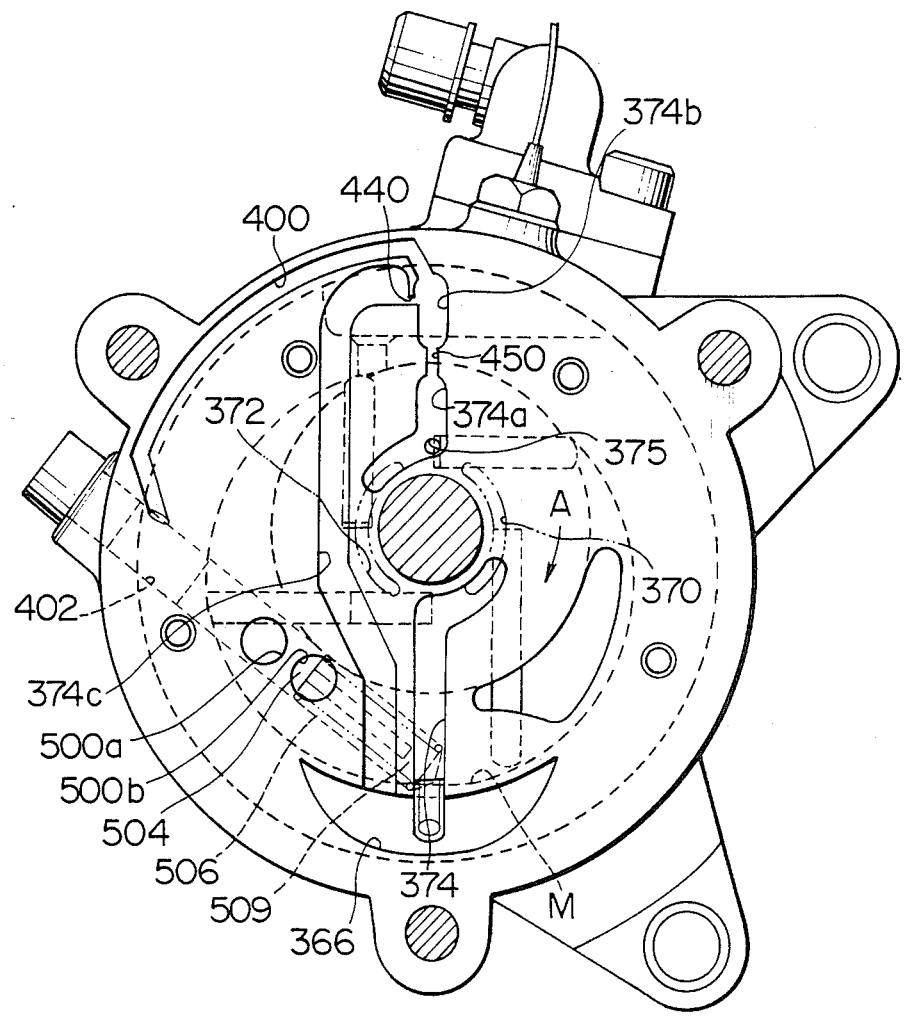
FIG. 9 is a cross-sectional view taken along the line IX—IX in FIG. 8.

FIGS. 8 and 9 show a second embodiment of the present invention in which a capacity control function is additionally given to the embodiment shown in FIG. 1 through 6. The description of the parts or components similar to those of the first embodiment will be omitted.

A passage 374 for drawing oil from an oil sump 366 communicates with a suction opening 370 of a trochoid pump 326. The oil discharged from the trochoid pump 326 is divided into four flows, the first flow of which is directed from a discharge opening 372 to a control chamber 402 through a first passage 374a, a passage 450 of a relatively low restricting degree, a second passage 374b and a plunger passage 400; the second flow being directed from the second passage 374b back to the oil sump 366 through an electromagnetic valve 378 and a third passage 374c; the third flow being directed from the second passage 374b to the third passage 374c through a restricted connecting passage 440 of a relatively high restricting degree; and the fourth flow being directed from the first passage 374a to an oil pressure chamber 330 through a passage 375. In this case, the electromagnetic valve 378 is so constructed that when energized the passage 374b is out of communication with the third passage 374c, and when deenergized, the first passage 374a is into communication with the third passage 374c. Although a capacity varying mechanism will be described later, with the electromagnetic valve 378 deenergized, the oil discharged from the trochoid pump 326 will not cause the pressure within the pressure chamber 330 to be raised, because the second passage 374b and the third passage 374c communicate with each other through connecting passages 410, 420, 425, and 430. Similarly, the pressure in the control chamber 402 is not also raised. When the electromagnetic valve 378 is energized, the communication between the connecting passages 420 and 430 is intercepted by a plunger 482 of the electromagnetic valve 378. Since the second and third passages 374 and 374c communicate with each other through the restricted connecting passage 440, the pressure in the oil pressure chamber 330 is raised, and the clutch member 332 and the friction plate 352 are engaged with each other, as shown in FIG. 8. After the engagement, the pressurized oil from the pump 326 is introduced into the control chamber 402 from the second passage 374b through a passage 400 so that the pressure in the control chamber 402 is raised to push down a plunger 504. Thus, when the clutch member 332 is engaged with the friction plate 352 at the start-up, the start-up is effected with a minimum capacity and, after the start-up, the control of the capacity is effected. Under the engaged condition with the electromagnetic valve 378 energized, as shown in FIG. 8, the control of a duty ratio of ON-OFF of the electromagnetic valve 378 makes it possible to control the pressure in the control chamber 402, to thereby enable a continuous capacity control without lowering the pressure in the oil pressure chamber 330, because the control chamber 402 is small in capacity in comparison with the oil pressure chamber 330 and the passage 450 between the first passage 374a and the second passage 374b is restricted. In summary, both the control of the engagement between the clutch member 332 and the friction plate 352 and the control of the discharge capacity of the compressor component can be made possible by the provision of the single electromagnetic valve.

Now, the capacity control mechanism will be described below. Two unload ports 500a and 500b communicate with a low pressure chamber 502. The plunger 504 is movably disposed in a cylinder bore. The plunger 504 has axial one end face thereof cooperating with the cylinder bore to define therein a communication chamber 509 and the other axial end face cooperating with the cylinder bore to define therein the control chamber 402. The communication chamber 509 communicates the compression chamber M with the low pressure chamber 502 through the ports 500a and 500b. The capacity control is effected by controlling the opening area of the unload ports 500a and 500b by the plunger 504. The plunger 504 can be held at any desired position by the biasing force of a spring 506 tending to urge the plunger 504 upwardly and the force due to the pressure in the control chamber 402.

The other construction and operation of the mechanism than those described above are similar to those of the first embodiment described above. With the above construction wherein the capacity control mechanism is incorporated and the minimum capacity start-up is achieved at the beginning of the clutch engagement, the torque transmitted at the beginning of the clutch engagement can be made further smaller so that the shock can be decreased or relieved and the durability of the shaft and the bearings can be improved.

A third embodiment of the present invention will be described below with reference to FIGS. 10 to 16.

Figure 10:
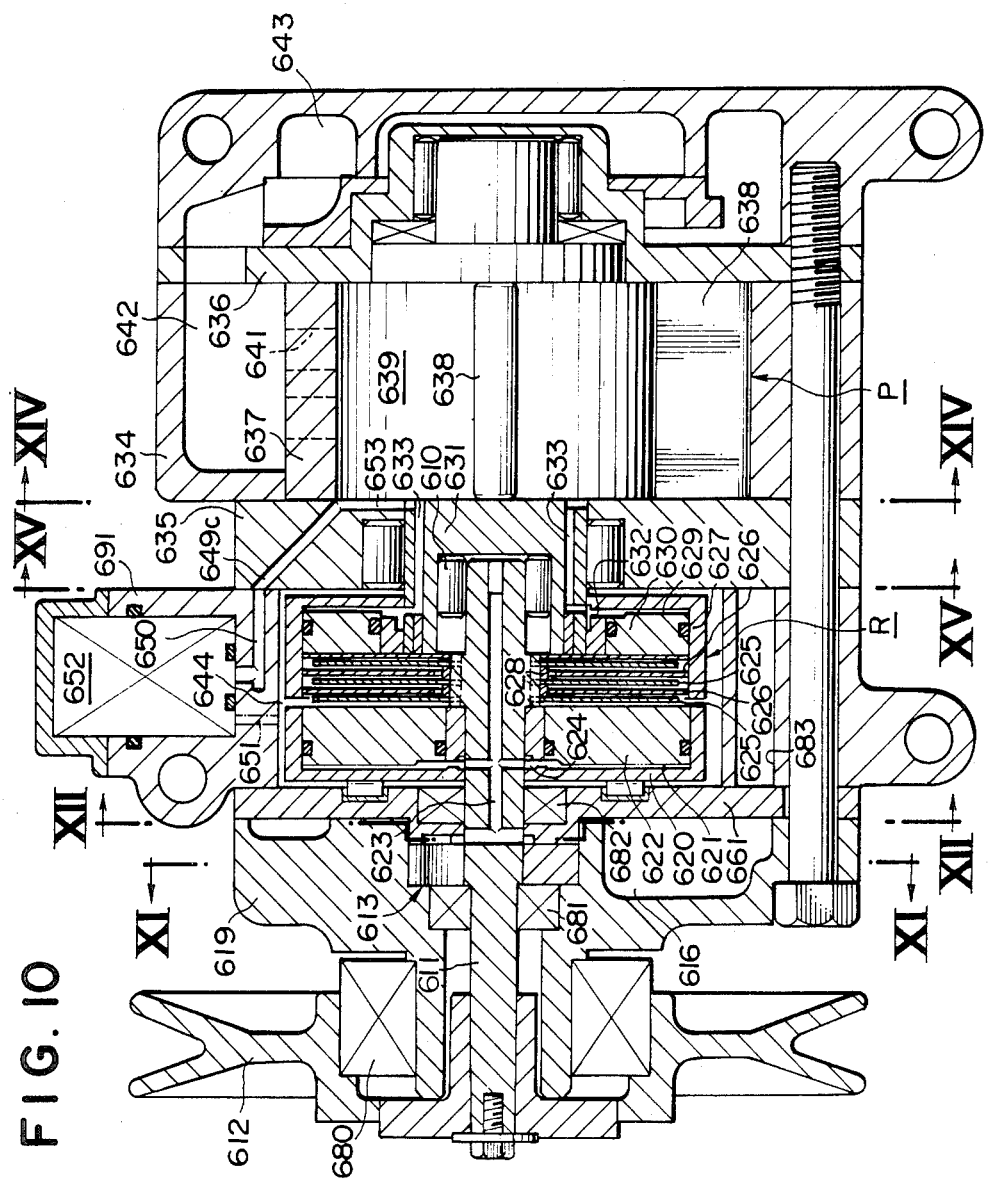
FIG. 10 is a longitudinal cross-sectional view showing a rotary compressor in accordance with a third embodiment of the present invention with a clutch component being in a disengaged position.

As shown in FIG. 10, a rotary compressor according to the third embodiment comprises basically a compressor component P and a pressure-type multi-plate clutch component R which is movable between engaged and disengaged positions by an oil pressure and a refrigerant pressure. The pressure-type multi-plate clutch component R is disposed between an input shaft 611 rotatably supported by a bearing 610 and a rotor shaft 631 of the compressor component P to be described later. The shaft 611 is connected to a pulley 612 for rotation therewith by means of splines. The pulley 612 is rotatably supported by a bearing 680 and is rotated by a driving source (not shown) such as an engine mounted on a vehicle, for example, through a V-belt.

Figure 11:
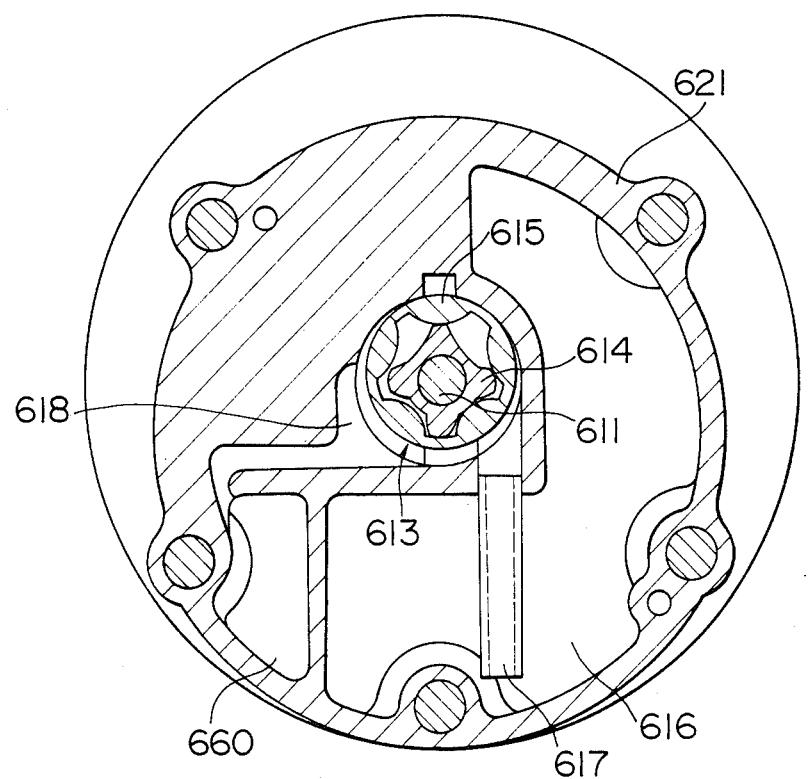
FIG. 11 is a cross-sectional view taken along the line XI—XI in FIG. 10.

A well known trochoid pump 613 of a relatively small discharge capacity is mounted on the shaft 611 for rotation therewith at a location between the oil seals 681 and 682 for the shaft 611. The pump 613 comprises an inner rotor 614 mounted on the shaft 611 for rotation therewith and an outer rotor 615 engaging with the inner rotor 614, as shown in FIG. 11. By the rotation of the rotors in the counterclockwise direction in FIG. 11, a working oil in an oil sump 616 formed by a recess in a housing 619 is drawn through a suction passage 617 extending downwardly and is discharged into a discharge passage 618 so that a pumping operation is effected. The suction passage 617 of the trochoid pump 613 communicates with a suction recess 662 formed in a housing plate 661 as shown in FIG. 12, and a discharge port of the trochoid pump 613 communicates with a discharge recess 663 in the housing plate 661 as well as with an annular groove 664 formed in the periphery of the shaft 611.

Figure 12:
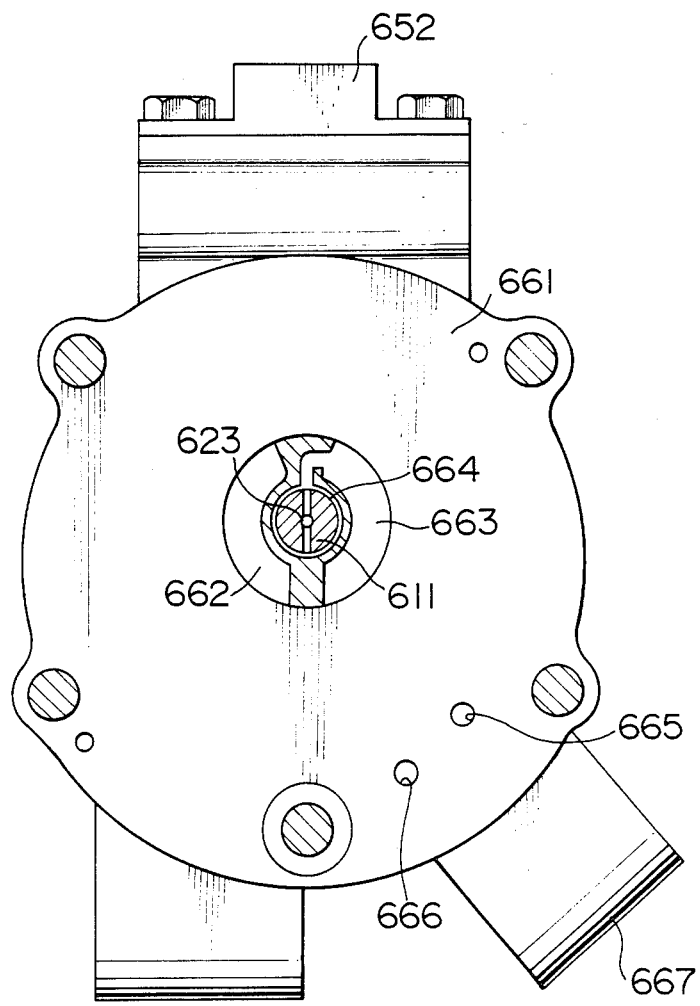
FIG. 12 is a cross-sectional view taken along the line XII—XII in FIG. 10.

As shown in FIG. 11, the discharge passage 618 communicates with a discharge oil chamber 660 which communicates with the oil sump 616 through ports 665 and 666 formed in the housing plate 661 and through an oil passage (not shown) communicating both the ports 665 and 666 with each other as shown in FIG. 12. An electromagnetic valve 667 is provided in the oil passage between the ports 665 and 666. When the electromagnetic valve 667 is energized, the oil passage between the ports 665 and 666 is closed and, when deenergized, the oil passage between the ports 665 and 666 is open so that the oil drawn from the oil sump 616 and discharged by the trochoid pump 613 is returned to the oil sump 616 through the discharge recess 663, the discharge passage 618, the discharge oil passage 660, the port 665, the oil passage between the ports 665 and 666, and the port 666. It is of course that in place of the electromagnetic valve 667 having its function as described above, an electromagnetic valve may be utilized which, when deenergized, closes the oil passage between the ports 665 and 666, and when energized, opens the oil passage between the ports 665 and 666.

Referring again to FIG. 10, a clutch oil cylinder 620 is fixedly secured to the shaft 611 for rotation therewith by means of a shrinkage fit, for example. The oil cylinder 620 has inner and outer peripheral walls to define therebetween an annular space. The oil cylinder 620 is disposed in a bore or a low pressure chamber 644 formed in an intermediate plate 691. A piston or an annular clutch oil plate 622 is disposed within the annular space in the oil cylinder 620 so as to be slidable axially of the shaft 611 and to oil-tightly define an oil pressure chamber 621 at the rear surface of the plate 622. The oil pressure chamber 621 communicates with the discharge recess 663 and the annular groove 664 of the previously described trochoid pump 613 through an oil passage 624 formed in the inner peripheral wall of the oil cylinder 620 and an oil passage 623 formed in the shaft 611. O-rings for the sealing purposes are provided on the inner and outer peripheral surfaces of the oil plate 622. The oil sump 616 communicates also with an oil chamber 683 formed in the intermediate plate 691.

Figure 13:
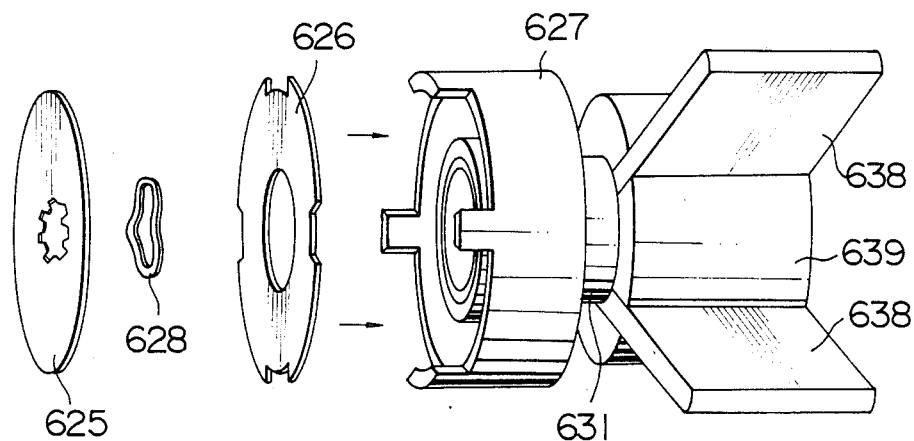
FIG. 13 is an exploded perspective view showing the clutch component shown in FIG. 10.
Figure 14:
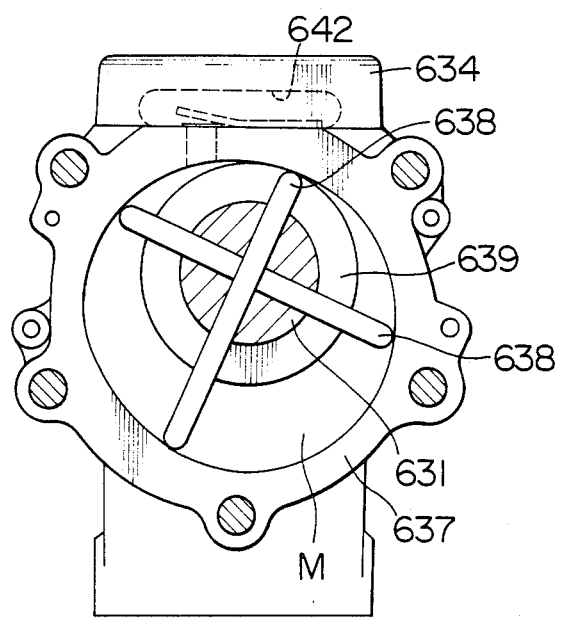
FIG. 14 is a cross-sectional view taken along the line XIV—XIV in FIG. 10.

A plurality of inner friction clutch discs 625 engaging with splines formed on the shaft 611 are provided at the right-hand end surface of the oil plate 622 as seen in FIG. 10. The inner clutch discs 625 are rotatable together with the shaft 611 and are slidable axially thereof. A plurality of outer frictional clutch discs 626 alternately interleaving with the inner clutch discs 625 are provided so as to be rotatable together with a clutch refrigerant cylinder 627 and to be slidable axially of the shaft 611, as shown in FIG. 13. The refrigerant cylinder 627 has inner and outer peripheral walls to define therebetween an annular space. The refrigerant cylinder 627 is disposed within the low pressure chamber 644 in the intermediate plate 691. The refrigerant cylinder 627 is connected to a rotor shaft 631 of the rotary compressor component P for rotation therewith. Corrugated annular springs 628 are arranged around the shaft 611 and between each pair of adjacent inner clutch discs 625 to urge the inner and outer clutch discs 625 and 626 away from each other.

A piston member or a clutch refrigerant plate 630 is provided within the annular space in the refrigerant cylinder 627 so as to be slidable axially of the shaft 611 and to fluid-tightly define a refrigerant pressure chamber 629 at the rear surface of the plate 630. O-rings for sealing purposes are provided on the inner and outer peripheral surfaces of the clutch refrigerant plate 630. The refrigerant pressure chamber 629 communicates with a high pressure compression chamber of the compressor component P through a refrigerant passage 632 formed in the inner peripheral wall of the refrigerant cylinder and a refrigerant passage 633 formed axially in the rotor shaft 631.

The compressor component P comprises, as shown in FIG. 10, a housing 634, a front plate 635, a rear plate 636, a cylinder 637 having a cylindrical inner surface and a rotor 639 having therein plate-like vanes 638. By the rotation of the rotor 639, the refrigerant is drawn through a suction opening 640 (shown in FIG. 15) formed in the front plate 635 and is discharged from a discharge opening 641 of the cylinder 637 into a refrigerating cycle (not shown) through a discharge valve (not shown), a discharge chamber 642 and an oil separator 643 for separating the working oil contained in the refrigerant. The suction opening 640 communicates with the low pressure chamber 644 in which the clutch component R is housed, to draw the refrigerant from the low pressure chamber 644.

Figure 15:
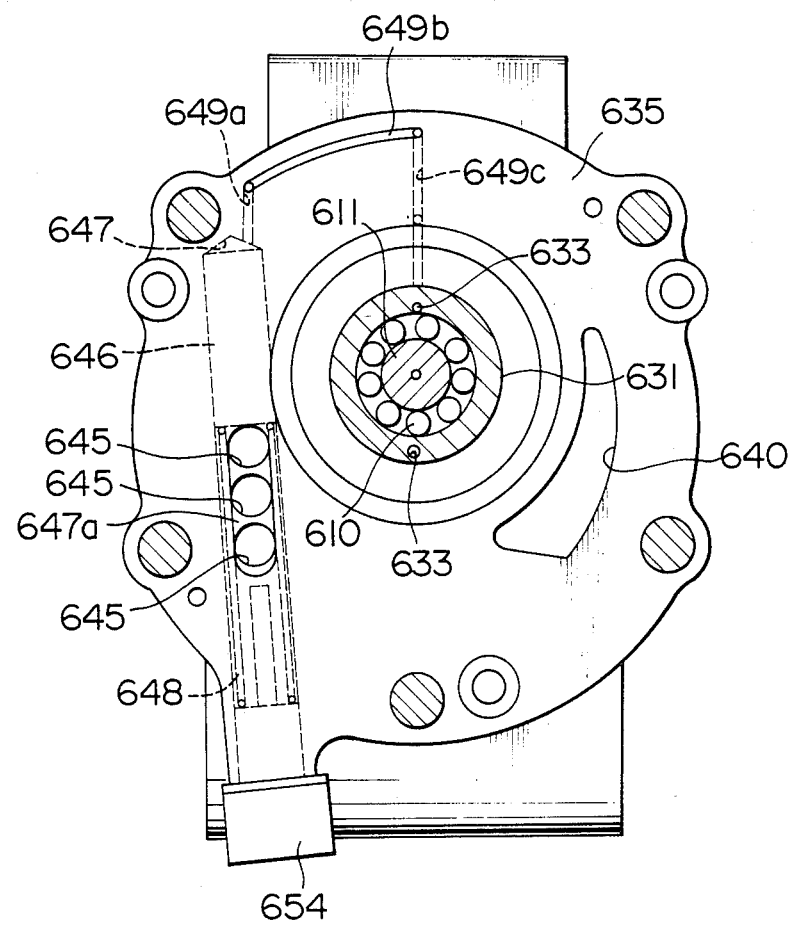
FIG. 15 is a cross-sectional view taken along the line XV—XV in FIG. 10.

As shown in FIG. 15, three unload ports 645 are formed in the front plate 635, which communicate the compression chamber M of the compressor component P (FIG. 14) with the low pressure chamber 644. The opening areas of the unload ports 645 are controlled by the movement of a plunger 646 slidably housed in a cylinder bore extending perpendicularly to these ports 645. The plunger 646 has axial one end face cooperating with the cylinder bore to define a control chamber 647 and the other axial end face cooperating with the cylinder bore to define a communication chamber 647a. The communication chamber 647a communicates the compression chamber M with the unload ports 645. The movement of the plunger 646 is controlled by the balance of the refrigerant pressure in the control chamber 647 and the biasing force of a spring 648 acting on the end of the plunger 646 opposite to the end thereof on which the refrigerant pressure acts.

The control chamber 647 communicates with the compression chamber M of the compressor component P on the midway of the compression stroke thereof through passages 649a, 649b and 649c, and also communicates with the low pressure chamber 644 through the passages 649c, 650 and 651, as shown in FIG. 10. An ON-OFF electomagnetic valve 652 is provided between the passages 650 and 651. When the electromagnetic valve 652 is energized, the valve 652 allows the passages 650 and 651 to communicate with each other so that the control chamber 647 communicates with the low pressure chamber 644 and, when the electromagnetic valve 652 is deenergized, it interrupts the communication between the passages 650 and 651 so that the refrigerant pressure in the control chamber 647 is controlled to variably control the position of the plunger 646 as desired.

On the other hand, the passage 649c communicating with the compression chamber M communicates with the refrigerant pressure chamber 629 through a passage 653 and the passages 632 and 633 as described previously. Thus, the ON-OFF of the electromagnetic valve 652 causes the pressure in the refrigerant pressure chamber 629 together with the pressure in the control chamber 647 to be controlled.

Figure 16:
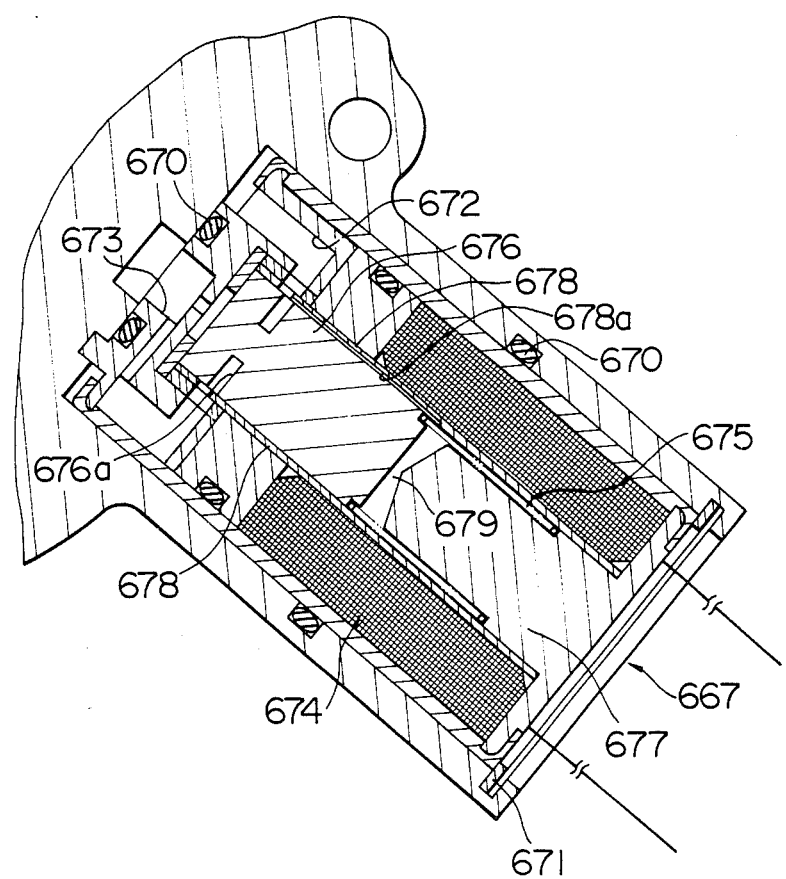
FIG. 16 is a cross-sectional view of an electromagnetic valve shown in FIG. 12.

Now, the construction of the previously described electromagnetic valve 667 will be described on the basis of FIG. 16. The electromagnetic valve 667 is sealed by an O-ring 670 and is secured to the intermediate plate 691 by a retainer 671. The previously described ports 665 and 666 communicate with the flow passages 672 and 673 of the electromagnetic valve 667, respectively. When electric current is supplied to a coil 647, a movable core 676 is attracted toward a stationary core 677 against the action of a coil spring 675 so that the communication between the flow passages 672 and 673 is intercepted by the movable core 676. When the coil 674 is deenergized, the flow passages 672 and 673 communicate with each other through an annular notch 676a formed around the outer periphery of the movable core 676. A groove 678a is formed in the inner peripheral surface of a sleeve 678 and extends longitudinally of the movable core 676. The groove 678a communicates a space between the movable core 676 and the stationary core 677 with the flow passage 672 which communicates with the discharge side of the trochoid pump 613. Thus, even though the coil 674 is energized to attract the movable core 676 against the stationary core 677, when the pressure of the discharged oil in the flow passage 672 rises above a predetermined value, the movable core 676 overcomes the attracting force and is moved leftwardly and upwardly in the figure. Thus, the electromagnetic valve 667 is so constructed that it serves also as an oil relief valve capable of communicating the flow passage 672 with the flow passage 673, when the oil pressure rises above the predetermined value. In the above described embodiment, the relief pressure is set to 10 kg/cm$^2$.

The operation of the third embodiment having the construction described above will be described below.

The driving force of the engine is transmitted to the shaft 611 and the trochoid pump 613 through the pulley 612. Under the condition that the electromagnetic valve 667 is deenergized, the working oil discharged from the trochoid pump 613 is returned to the oil sump 616 and is not supplied to the oil pressure chamber 621, as described previously. Accordingly, the rotary force of the shaft 611 is not transmitted to the rotor shaft 631.

When a switch (not shown) of the air-conditioning system for the vehicle is turned on, the electromagnetic valve 667 is energized, so that the port 662 communicating with the discharge oil chamber 660 is intercepted from the port 663 communicating with the oil sump 616. Then, the pressure of the oil discharged from the trochoid pump 613 is raised, and the thus raised pressure is introduced into the oil pressure chamber 621 through the oil passage 623 in the shaft 611 and the oil passage 624 in the oil cylinder 620, so that oil plate 622 is biased and slid toward the right in FIG. 10. Therefore, the inner clutch discs 625 and the outer clutch discs 626 are gradually urged against each other by the oil plate 622 so that the inner clutch discs 625 engage frictionally with the outer clutch discs 626 thereby permitting the rotating force of the shaft 611 to be transmitted to the rotor shaft 631 through the refrigerant cylinder 627.

When the rotor shaft 631 and the rotor 639 commence their rotation, the compressor component P draws the refrigerant within the low pressure chamber 644 and compresses the refrigerant. The compressed refrigerant is discharged out of the compressor component P through the discharge opening 641, the discharge chamber 642 and the oil separator 643. At this time, since the electromagnetic valve 652 is in the deenergized position, the refrigerant pressure within the compression chamber is led to the control chamber 647 in the first plate 635 through the passages 649a, 649b and 649c shown in FIG. 15, so that the plunger 646 successively closes the unload ports 645 to control the discharge capacity so as to be increased.

On the other hand, the refrigerant pressure in the compression chamber is led to the refrigerant pressure chamber 629 through the passage 643, the refrigerant passage 632 in the rotor shaft 631 and the refrigerant passage 633 in the refrigerant cylinder 627. Thus, the refrigerant plate 630 is biased and slid toward the left in FIG. 10, thereby further urging the inner and outer clutch discs 625 and 626 against each other to cause them to be firmly engaged with each other.

In other words, the inner clutch discs 625 are gradually engaged with the outer clutch discs 626 by the oil pressure of the trochoid pump 613 at the start-up of the compressor component P, thereby causing the rotating force of the shaft 611 to be transmitted to the rotor shaft 631. After the start-up of the compressor component P, the discharged refrigerant urges the outer clutch discs 626 and the inner clutch discs 625 against each other thereby engaging them more firmly with each other. After the firm engagement between the discs 625 and 626, the electromagnetic valve 667 may be deenergized to allow the discs 625 and 626 to be maintained engaged with each other only by the refrigerant pressure from the compressor component P.

In case where the electromagnetic valve 652 is controlled in an ON-OFF manner, in response to the refrigerant load in the refrigeration cycle, to control the opening and closing of the unload ports 645, a restriction is provided in the midway of the passage 649c to prevent the pressure in the refrigerant pressure chamber 629 from varying excessively.

When the switch of the air-conditioning system is turned off, the electromagnetic valve 667 is deenergized, and the oil pressure discharged from the trochoid pump 613 is relieved to the oil sump 616 so that the oil pressure does not act to the oil pressure chamber 621. When the electromagnetic valve 652 is energized, the refrigerant pressure in the refrigerant pressure chamber 629 is relieved to the low pressure chamber 644 through the refrigerant passages 632 and 633 and the passages 653, 649c and 651. This causes the inner clutch discs 625 to be moved away from the outer clutch discs 626 by the biasing force of the corrugated annular springs 628 to disengage them from each other so that the shaft 611 is disconnected from the rotor shaft 631. After the disconnection of the shaft 611 from the rotor shaft 631, the electromagnetic valve 652 is deenergized.

In case the temperature of the air blown out of the evaporator of the refrigeration cycle is detected by the thermister to energize or deenergize the clutch component R for the defrosting purposes, the above-described engagement and disengagement of the clutch component is of course effected.

After the compressor component P has been started in operation, the electromagnetic valve 667 may be deenergized. In this case, the discharge oil from the trochoid pump 613 is returned to the oil sump 616 and the load for driving the trochoid pump 613 can be rendered substantially to zero. This makes it possible to reduce the load for rotationally driving the shaft 611 in comparison with the case where the discharged oil from the trochoid pump 613 is constantly supplied to the oil pressure chamber 621. In case of a combination of a conventional rotary compressor component and electromagnetic clutch component, the electromagnetic clutch is in general required to be maintained energized constantly during the engagement of the clutch, whereas, with the arrangement of the present invention described above, merits are obtained that no external input is required for maintaining the engagement of the clutch, because the high gas refrigerant pressure from the compressor component is utilized for maintaining the clutch engaged.

The third embodiment has been described in which the high gas refrigerant pressure is introduced into the refrigerant pressure chamber 629 from the compression chamber M of the compressor component P, and the pressure of the control chamber 647 of the capacity varying mechanism is controlled by the electromagnetic valve 652. However, an electromagnetic valve may be provided exclusively for obtaining the high gas refrigerant pressure from the discharge chamber 642 or exclusively for controlling only the pressure of the refrigerant pressure chamber 629.

Incidentally, although the third embodiment has been described as utilizing a vane-type compressor component, a compressor component of other type such as a scroll type, a wobble-type or rolling piston-type may of course be applicable to the present invention. Since a lubricant oil similar to that contained in the refrigerant is used as the working oil for the trochoid pump 613, the working oil may be commonly used for the compressor component and for the trochoid pump 613 by communicating the low pressure chamber 644 with the oil sump 616 of the trochoid pump 613.

According to the third embodiment as described above with reference to FIGS. 10 to 16, the oil discharged from the oil pump is supplied to the oil pressure chamber to move the clutch oil plate for urging the friction clutch discs against each other at the start-up of the compressor compoent so that the shaft is connected to the rotor. After the start-up, the high refrigerant pressure obtained by the compressor component is supplied to the refrigerant pressure chamber through the communication passage, causing the clutch refrigerant plate to be moved toward the clutch oil plate thereby urging the friction clutch discs against each other to connect the shaft to the rotor member. Thus, since the high pressure refrigerant obtained by the compressor component is used for engaging the clutch after the start-up, the discharged oil from the oil pump is required only for the start-up. Accordingly, it is possible to utilize an oil pump having a small size and a small discharge capacity, and the rotary compressor can be made relatively compact in structure as a whole. Further, the utilization of a multiplate clutch makes it possible to cause the clutch to be gradually or gently engaged in comparison with the use of an electromagnetic clutch, thereby improving the drivability of the vehicle having mounted thereon the rotory compressor.

What is claimed is:

1. A rotary compressor, comprising:
   an input shaft;
   a compressor component including a housing and a rotor member rotatably disposed in said housing and connectable to said input shaft, said housing defining at least one compression chamber having a volume varying with the rotation of said rotor member, a first pressurized working fluid being discharged from the compression chamber when said rotor member is connected to said input shaft and rotated thereby;
   a clutch component including a first clutch cylinder, a first piston member disposed in said first clutch cylinder so as to be movable axially of said input shaft and cooperating with said first clutch cylinder to define therein a first pressure chamber, a second clutch cylinder connected to said rotor member for rotation therewith, a second piston member disposed in said second clutch cylinder so as to face to said first piston member but spaced therefrom axially of said input shaft and cooperating with said second clutch cylinder to define therein a second pressure chamber, a plurality of first clutch members disposed between said first and second piston members and mounted on said input shaft for rotation therewith, a plurality of second clutch members with one disposed between each pair of adjacent first clutch members and mounted on said second clutch cylinder for rotation therewith, said first and second clutch members being movable axially of said input shaft between an engaged position where said first and second clutch members engage with each other to allow a torque to be transmitted from said input shaft to said rotor member and a disengaged position where said first and second clutch members are disengaged form each other to prevent the torque from being transmitted from said input shaft to said rotor member, and biasing means for biasing said first and second clutch members toward said disengaged position;
   a hydraulic pump drivingly connected to said input shaft for discharging a second pressurized working fluid upon the rotation of said input shaft;
   first valve means movable between a first position where said second pressurized working fluid from said hydraulic pump is allowed to be applied to said first pressure chamber to cause said first piston member to move said first and second clutch members to said engaged position against the action of said biasing means and a second position where said second pressurized working fluid from said hydraulic pump is prevented from being applied to said first pressure chamber to cause said biasing means to move said first and second clutch members to said disengaged position; and
   second valve means movable between a first position where said first pressurized working fluid from said compressor component is allowed to be applied to said second pressure chamber to cause said second piston member to move said first and second clutch members to said engaged position against the action of said biasing means and a second position where said first pressurized working fluid from said compressor component is prevented from being applied to said second pressure chamber to cause said biasing means to move said first and second clutch members to said disengaged position.

2. A rotary compressor as defined in claim 1, wherein said first cylinder is disposed around said input shaft and mounted on said input shaft for rotation therewith, said first piston member being mounted on said input shaft for rotation therewith and for sliding along said input shaft.

3. A rotary compressor as defined in claim 2, including:
   a sump for said second working fluid;
   said hydraulic pump having a suction port communicating with said sump and a discharge port;
   a discharge passage having one end thereof communicating with said discharge port and the other end communicating with said sump; and
   said first valve means comprising an electromagnetic valve occupying said first position of said first valve means when energized and said second position of said first valve means when deenergized.

4. A rotary compressor as defined in claim 3, including:
   a low pressure chamber for said first working fluid;
   a first passage for introducing said first pressurized working fluid from said compressor component into said second pressure chamber;
   a second passage having one end thereof communicating with said first passage and the other end communicating with said low pressure chamber; and said second valve means being movable between said first position thereof closing said second passage and said second position of said second valve means opening said second passage.

5. A rotary compressor as defined in claim 4, wherein said second valve means comprises an electromagnetic valve which occupies said second position of said second valve means when energized and said first position of said second valve means when deenergized.

6. A rotary compressor as defined in claim 5, wherein said rotor member of said compressor component comprises a rotor and at least one vane movably mounted on said rotor with the vane cooperating with said housing to define said at least one compression chamber.

7. A rotary compressor as defined in claim 6, wherein said first working fluid is a refrigerant, and said second working fluid is a lubricating oil.

8. A rotary compressor as defined in claim 1, including:
a low pressure chamber for said first working fluid;
port means communicating said compression chamber with said low pressure chamber; and
adjusting means movable by said first pressurized working fluid from said compressor component for adjusting an opening area of said port means.

9. A rotary compressor as defined in claim 8, including:
a first passage for introducing said first pressurized working fluid from said compressor component into said second pressure chamber;
a second passage having one end thereof communicating with said first passage and the other end communicating with said low pressure chamber;
said second valve means being provided in said second passage and movable between said first position of said second valve means closing said second passage and said second position of said second valve means opening said second passage;
a third passage having one end thereof communicating with said second passage between said one end thereof and said second valve means; and
said adjusting means comprising a cylinder bore, a plunger movably disposed in said cylinder bore and having one axial end face cooperating with said cylinder bore to define a control chamber and the other axial end face cooperating with said cylinder bore to define a communication chamber, the other end of said third passage communicating with said control chamber, said communication chamber communicating said compression chamber with said low pressure chamber through said port means, and spring means disposed in said communication chamber for biasing said plunger in the direction against the action of said first pressurized working fluid from said second pressure chamber.

10. A rotary compressor as defined in claim 9, wherein said first working fluid is a refrigerant, and said second working fluid is a lubricating oil.

* * * * *